United States Patent
Zhang et al.

(10) Patent No.: US 10,846,870 B2
(45) Date of Patent: Nov. 24, 2020

(54) JOINT TRAINING TECHNIQUE FOR DEPTH MAP GENERATION

(71) Applicant: Adobe Inc., San Jose, CA (US)

(72) Inventors: Jianming Zhang, Campbell, CA (US); Zhe Lin, Fremont, CA (US); Xiaohui Shen, San Jose, CA (US); Oliver Wang, Seattle, WA (US); Lijun Wang, Dalian (CN)

(73) Assignee: Adobe Inc., San Jose, CA (US)

( * ) Notice: Subject to any disclaimer, the term of this patent is extended or adjusted under 35 U.S.C. 154(b) by 159 days.

(21) Appl. No.: 16/204,785

(22) Filed: Nov. 29, 2018

(65) Prior Publication Data

US 2020/0175700 A1 Jun. 4, 2020

(51) Int. Cl.
| | |
|---|---|
| *G06K 9/46* | (2006.01) |
| *G06T 1/20* | (2006.01) |
| *G06T 3/40* | (2006.01) |
| *G06T 7/11* | (2017.01) |
| *G06T 7/194* | (2017.01) |
| *G06T 7/50* | (2017.01) |

(52) U.S. Cl.
CPC ............... *G06T 7/50* (2017.01); *G06K 9/46* (2013.01); *G06T 3/4007* (2013.01); *G06T 7/194* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

| 10,089,740 | B2* | 10/2018 | Srikanth | H04N 5/272 |
|---|---|---|---|---|
| 2016/0350930 | A1* | 12/2016 | Lin | G06K 9/4628 |
| 2018/0144477 | A1* | 5/2018 | Shi | G06K 9/3233 |
| 2019/0096125 | A1* | 3/2019 | Schulter | G05D 1/0088 |
| 2020/0167930 | A1* | 5/2020 | Wang | G06T 7/0012 |

OTHER PUBLICATIONS

Mousavian et al., "Joint Semantic Segmentation and Depth Estimation with Deep Convolutional Networks," 2016 Fourth International Conference on 3D Vision (3DV), pp. 611-619, Oct. 25-28, 2016 (Year: 2016).*

(Continued)

*Primary Examiner* — Soo Shin
(74) *Attorney, Agent, or Firm* — SBMC

(57) ABSTRACT

Joint training technique for depth map generation implemented by depth prediction system as part of a computing device is described. The depth prediction system is configured to generate a candidate feature map from features extracted from training digital images, generate a candidate segmentation map and a candidate depth map from the generated candidate feature map, and jointly train portions of the depth prediction system using a loss function. Consequently, depth prediction system is able to generate a depth map that identifies depths of objects using ordinal depth information and accurately delineates object boundaries within a single digital image.

20 Claims, 9 Drawing Sheets
(4 of 9 Drawing Sheet(s) Filed in Color)

(56) References Cited

OTHER PUBLICATIONS

Liu et al., "Deep Convolutional Neural Fields for Depth Estimation from a Single Image," 2015 IEEE Conference on Computer Vision and Pattern Recognition (CVPR), Jun. 7-12, 2015 (Year: 2015).*
Laina et al., "Deeper Depth Prediction with Fully Convolutional Residual Networks," 2016 Fourth International Conference on 3D Vision (3DV), Oct. 25-28, 2016 (Year: 2016).*
Deng,"ImageNet: A Large-Scale Hierarchical Image Database", In Proceedings of IEEE Conference on Computer Vision and Pattern Recognition, Jun. 20, 2009, 8 pages.
Eigen,"Depth Map Prediction from a Single Image using a Multi-Scale Deep Network", Advances in neural information processing systems, 2014., Jun. 9, 2014, 9 pages.
Geiger,"Are we ready for Autonomous Driving? The KITTI Vision Benchmark Suite", Conference on Computer Vision and Pattern Recognition (CVPR), 2012., Jun. 2012, 8 pages.
He,"Deep Residual Learning for Image Recognition", Proceedings of the IEEE conference on computer vision and pattern recognition, 2016., Dec. 10, 2015, 12 pages.
Laina,"Deeper Depth Prediction with Fully Convolutional Residual Networks", 2016 Fourth International Conference on 3D Vision (3DV), IEEE, Sep. 19, 2016, 12 pages.
Li,"MegaDepth: Learning Single-View Depth Prediction from Internet Photos", Computer Vision and Pattern Recognition (CVPR), 2018., Apr. 2, 2018, 10 pages.
Liu,"Deep Convolutional Neural Fields for Depth Estimation from a Single Image", Proceedings of the IEEE Conference on Computer Vision and Pattern Recognition 2015, Dec. 18, 2014, 13 pages.
Silberman,"Indoor Segmentation and Support Inference from RGBD Images", Proceedings of the 12th European Conference on Computer Vision, 2012., Oct. 2012, 14 pages.
Srinivasan,"Aperture Supervision for Monocular Depth Estimation", Computer Vision and Pattern Recognition (CVPR), 2018., Mar. 29, 2018, 13 pages.
Wang,"Learning to Detect Salient Objects with Image-level Supervision", 2017 IEEE Conference on Computer Vision and Pattern Recognition (CVPR), Jul. 2017, pp. 136-145.
Zhao,"Pyramid Scene Parsing Network", IEEE Conf. on Computer Vision and Pattern Recognition (CVPR), 2017., Apr. 27, 2017, 11 pages.

* cited by examiner

600

602
Generate an initial feature map by extracting features from a single digital image using an encoder of a neural network

604
Generate the feature map by upsampling the initial feature map using a decoder of the neural network

606
Generate a depth map of the single digital image from the feature map using a depth module of the neural network

608
Output the generated depth map

*Fig. 6*

JOINT TRAINING TECHNIQUE FOR DEPTH MAP GENERATION

BACKGROUND

Digital effect generation systems include digital design and editing tools that enable content creators to create and edit digital images using a variety of digital effects. These digital effects may be included in the digital images via tools presented in a variety of visual guides and panels with which content creators interact via, e.g., a user interface. Digital effects can be generated on or applied to the entire digital image, specific objects in the image, or select regions within these objects, resulting in intricate digital effect configurations.

In some instances, generation of the digital effect is based on a depth map that describes a depth of objects within the digital image. One example of a digital effect that relies on a depth map is a depth-of-field blur effect, which draw's a user's attention to a particular portion of the digital image by blurring or obscuring other portions of the image based on depths of object included within the image. The depth map indicates respective distances of objects included in the digital image from a particular viewpoint. To do so, the depth map may employ colors to indicate depths associated with objects at respective pixels in the digital image. An object in the foreground of the digital image, for instance, may be depicted using a dark red color, an object in the background of the digital image may be depicted using a light blue color, and so on.

In some instances, however, conventional systems do not have the capability to accurately generate a depth map for a digital image. The digital image, for instance, may be a single digital image and therefore does not include disparity information that is usable to determine depth as would be the case from multiple digital images. In another instance, digital cameras that support depth sensing (e.g., through dedicated devices) may suffer from range, image quality, and resolution limitations that adversely affect depth map accuracy. Additionally, using conventional techniques to generate depth maps that clearly delineate objects boundaries proves to be a challenge because adequate quality ground truth depth data needed to train conventional systems is difficult to collect. As such, digital effects that rely on depth maps generated using conventional techniques have limited accuracy and may introduce visual artifacts and errors.

Another challenge is that conventional systems generate depth maps by calculating an absolute depth of objects within digital images that do not clearly delineate the boundaries around these objects. As a result, digital effects that are applied based on these depth maps may introduce errors and image artifacts in and around object boundaries. This results in user frustration and inefficient use of computational resources in both the generation of depth maps and application of digital effects that rely on these depth maps.

SUMMARY

Depth prediction techniques and systems are described that address the challenges of conventional techniques to generate a depth map from a single digital image, namely the delineation of boundaries of objects within the digital image. To do so, a depth module of a neural network is jointly trained with a segmentation module of the neural network such that the depth module is configured to generate a depth map having accurate boundaries. In one example, a depth prediction system begins by generating at least one candidate feature map by extracting features from training digital images using a feature extraction module of a neural network, e.g., through use of an encoder and decoder.

The at least one candidate feature map is then passed as an input to a depth module and a segmentation module of the neural network. The depth module of the neural network generates a candidate depth map from the at least one candidate feature map using machine learning. The segmentation module generates a candidate segmentation map from the at least one candidate feature map using machine learning. The candidate segmentation map partition pixels of at least one of the digital images into respective segments, e.g., foreground or background segments.

The candidate depth map and candidate segmentation map are then passed to a joint training module. The joint training module compares the candidate depth map with ground truth depth maps and the candidate segmentation map with ground truth segmentation maps, respectively, using a loss function. A result of the comparison based on the loss function, is used by the joint training module to jointly train the depth module and the segmentation module.

Joint training of the depth module with the segmentation module of the neural network of the depth prediction system overcomes the limitations of conventional techniques, which are not able to clearly delineate object boundaries in a single digital image. In one example, the segmentation module of the above described neural network augments the training of the depth module by partitioning the digital image into either foreground or background segments. This augmented training enables the depth module to identify the boundaries of objects within the digital image with increased accuracy. Increased accuracy of the depth map therefore increases accuracy of digital effects applied to the digital image that rely on the depth map. This improves operation of a computing device that employs these techniques and user efficiency in interaction with the device, further discussion of which is included in the following sections.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing execute in color. Copies of this patent or patent application publication with color drawing(s) will be provided by the Office upon request and payment of the necessary fee. The detailed description is described with reference to the accompanying figures. Entities represented in the figures may be indicative of one or more entities and thus reference may be made interchangeably to single or plural forms of the entities in the discussion.

FIG. 6 depicts a flow diagram depicting an example procedure the depth prediction system configured to generate a depth map that accurately delineates objects boundaries within a digital image after the system's depth module has been jointly trained.

DETAILED DESCRIPTION

Overview

Figure 1:
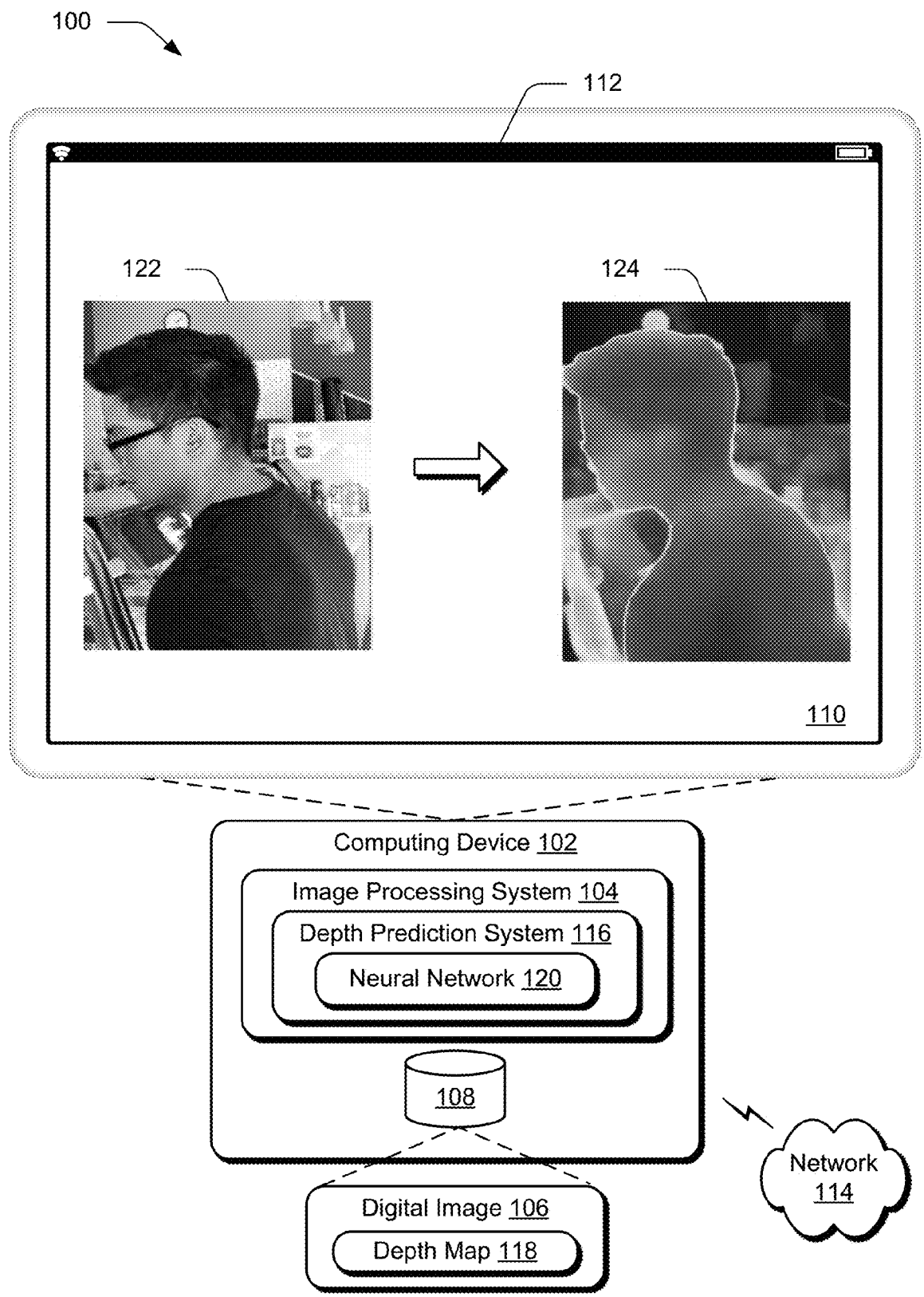
FIG. 1 is an illustration of a depth prediction system operable to enable generation of a depth map that accurately delineates object boundaries within a digital image.

Conventional techniques used to generate a depth map from a single digital image are confronted with numerous challenges that adversely affect the ability of conventional techniques to accurately apply digital effects to the digital image. One example of a digital effect that relies on depth maps for its generation is a depth-of-field blur effect. The depth-of-field blur effect draw's a user's attention to a particular portion of the digital image by blurring or obscuring another portion of the digital image. The depth-of-field blur effect is based on depths of objects within the digital image in relation to each other. Such an effect, when inaccurately applied or included in a manner that is not intended by the user, introduces inefficiencies in digital image design, reduces aesthetic appeal of digital images, and frustrates users.

A depth map provides information about the distance of one or more objects included in the digital image from a particular viewpoint. In one example, the locations of objects and their relative distances are depicted using various colors. An object in the foreground of the digital image, for instance, may be depicted using a dark red color, while another object in the background may be depicted using a light blue color. Conventional systems, however, have a limited ability to generate accurate depth maps, especially from a single digital image for which disparity information is not available. The accuracy of these conventional systems may be significantly limited by range, image quality, image resolution, and so on, each of which significantly affects depth map generation. Specifically, conventional systems lack accurate training data to effectively train conventional systems to generate depth maps that clearly delineate object boundaries within digital images. Consequently, the ability of conventional systems to accurately apply digital effects based on these depth maps is limited.

The depth prediction systems and techniques herein address these challenges through joint training of a neural network such that the depth map that is generated using these depth prediction systems and techniques has clearly delineated boundaries between objects in the image. As previously stated, using conventional techniques to clearly delineate objects boundaries proves to be a challenge because adequate quality ground truth depth data that is needed to train conventional systems is difficult to collect.

The depth prediction systems and techniques described herein address this challenge by jointly training the depth module and the segmentation. Specifically, to compensate for the lack of ground truth depth data of adequate quality, the depth prediction system described herein trains the segmentation module using accurate segmentation data—data that enables the depth prediction system to effectively learn how to delineate the foreground of the digital image from the background of the digital image. Augmenting the training of the depth module with the segmentation module that is trained on accurate segmentation data enables the depth prediction system to generate depth maps that accurately identify boundaries between objects in digital images.

In one example of the depth prediction system, a feature extraction module of the neural network of the depth prediction system begins by extracting features from training digital images (e.g., through use of an encoder and decoder of the neural network) to generate at least one candidate feature map. The training digital images may depict, for example, a variety of different objects in multiple depth planes.

The candidate feature map is then passed as an input to a depth module of the neural network, which then generates a candidate depth map from the candidate feature map and a segmentation module of the neural network to generate a candidate segmentation map from the candidate feature map. In one example, the candidate depth map describes an ordinal depth of objects in the image in relation to each other (as opposed to an absolute depth) and the candidate segmentation map segments pixels of at least one of the training digital images into a respective foreground segment or background segment.

The candidate depth map and candidate segmentation map are then output to a joint training module of the neural network to jointly train the depth and segmentation module of the neural network using a loss function. The loss function is used by the joint training module to compare the candidate segmentation map with a ground truth segmentation maps and the candidate depth map with a ground truth depth maps as part of supervised machine learning. Weights generated by the segmentation module as part of the training are shared with the depth module. In this way, the joint training module employs the loss function such that the training of the segmentation module augments the training of the depth module to accurately identify boundaries between objects within at least one of these training digital images. As a result, the trained depth module of the neural network is configured to generate depths maps with increased accuracy over conventional techniques that include clearly delineated boundaries between objects in the digital image, even for a single digital image in which disparity information is not available. Consequently, the depth prediction system described herein enables image processing systems to generate digital effects, e.g. depth-of-field blur effects, with increased accuracy by avoiding visual artifacts at object boundaries that occur when conventional techniques are used. Thus, the techniques described herein exhibit increased accuracy and computational resource efficiency over conventional techniques, further discussion of which is included in the following sections.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 9.

The computing device 102 is illustrated as including an image processing system 104. The image processing system 104 is implemented at least partially in hardware of the computing device 102 to process and transform a digital image 106, which is illustrated as maintained in storage 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 may also be implemented as whole or part via functionality available via the network 114, such as part of a web service or "in the cloud."

An example of functionality used by the image processing system 104 to edit the digital image 106 is represented by a depth prediction system 116 to generate a depth map 118 using a neural network 120. The depth map 118 indicates depths of objects within the digital image 106. This may include absolute depths that describe depth values of pixels with respect to a particular viewpoint using absolute depth values and ordinal depths which describes depths of objects with respect to each other within the digital image. The depth map 118, for instance, may be used to identify a depth plane at which a particular object is located within the digital image 106. A depth map 118 that accurately identifies such depth information facilitates the application of digital effects, e.g. depth-of-field blur effects, on the digital image by the image processing system 104 in an accurate and effective manner as previously described.

As described above, conventional systems do not have the ability to generate accurate depth maps, especially for single digital images. Accordingly, systems that rely on such depth map information, e.g. depth map with limited or poor quality, also generate digital effects on digital image with poor accuracy. Additionally, conventional depth map systems generate depth maps by identifying the absolute depth of objects within digital images, e.g., depth values describing a distance between a particular viewpoint and the object. As a result, errors and artifacts are typically introduced around object boundaries, which in turn reduces the depth map accuracy and the ability of systems to apply digital effects on the digital image.

The depth prediction system 116 addresses the above described deficiencies such that a depth map 118 may be generated accurately from a single digital image 106 through joint training of a neural network 120. In the illustrated example in the user interface 110, a single digital image 122 is processed by a trained neural network 120 to generate a depth map 124. The digital image 122 shows an individual wearing glasses in the foreground with numerous objects such as a clock, table, ceiling lights, and various types of lab equipment at various depth planes within the image. As illustrated, the depth map 124 includes boundaries that are clearly delineated between a foreground object (e.g., the individual) and background objects, e.g., the lab equipment, table, and so forth.

Figure 7:
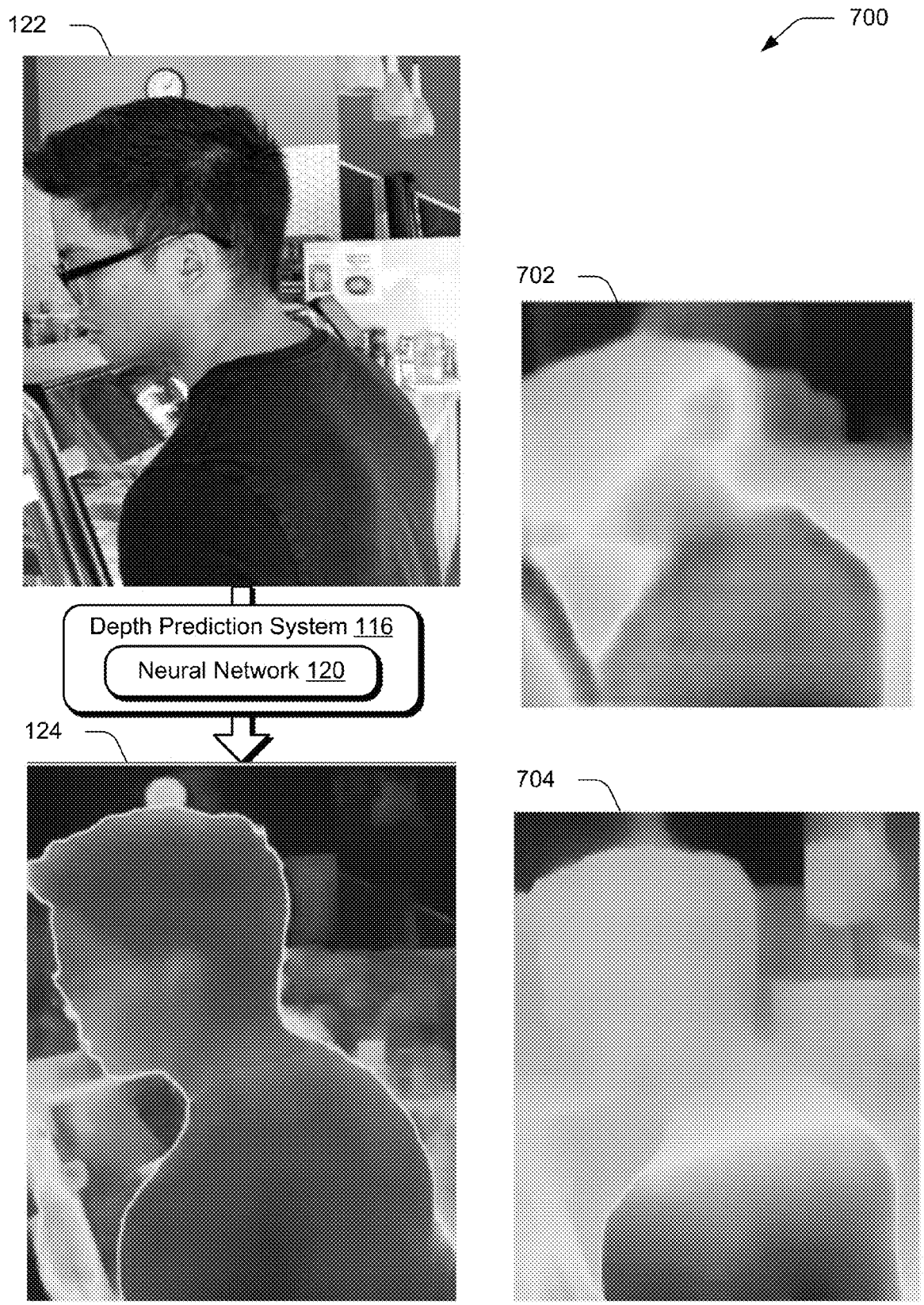
FIG. 7 depicts a first example contrasting a depth map generated using the described jointly trained depth module with the depth maps generated by conventional depth map generation techniques.

As shown in an example 700 of FIG. 7, for instance, the foreground object of the user in the depth map 124 generated by the depth prediction system 116 has increased accuracy over first and second examples 702, 704 of conventional depth map generation techniques that do not differentiate clearly between the objects. Likewise, as shown in an example 800 of FIG. 8 a single digital image 802 is processed by the neural network 120 of the depth prediction system 116 that is jointly trained to generate a depth map 804 that clearly differentiates between objects (e.g., birds) in the digital image as contrasted with a depth map 806 generated using conventional techniques.

To achieve this accuracy, a depth module of the neural network 120 is jointly trained with a segmentation module to train the depth module to accurately identify object borders. The segmentation module of the neural network 120 is configured to partition pixels in training digital images into respective segments, e.g., foreground or background segments, to generate segmentation maps. Training of the segmentation module of the neural network 120 to generate segmentation maps is performed jointly with training of the depth module of the neural network 120 to generate depth maps. In this way, the depth module is also trained to accurately identify borders within the training digital images. In the following discussion, a first section describes joint training of a depth module of the neural network 120 with a segmentation module and is followed by a second section that describes use of the trained depth module to generate a depth map from a single digital image.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Joint Training Technique of Depth Module to Generate Depth Map

Figure 2:
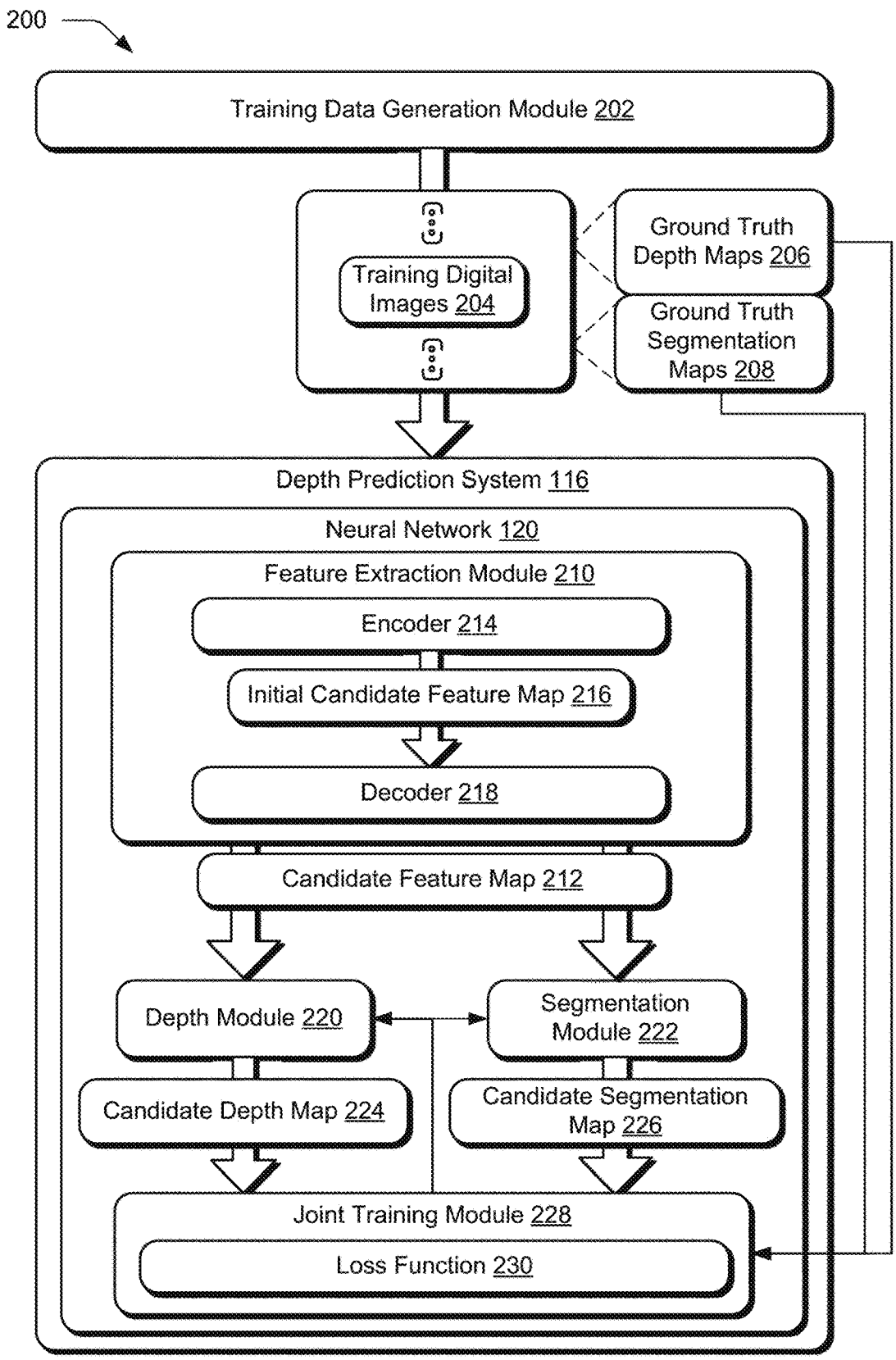
FIG. 2 depicts an example implementation of the depth prediction system with a neural network that includes a feature extraction module, a depth module, a segmentation module, and a joint training module.
Figure 3:
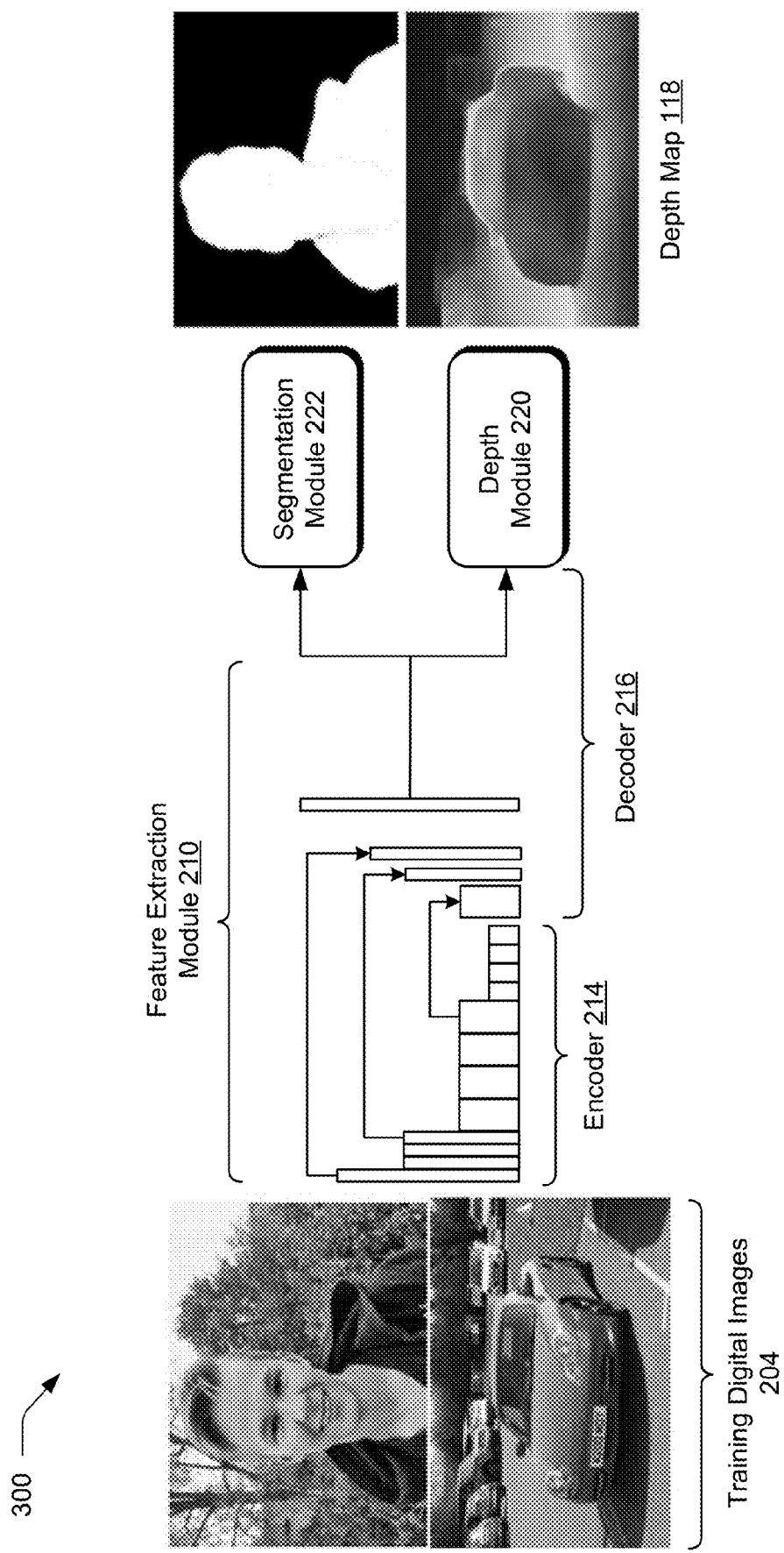
FIG. 3 depicts the various components comprising the depth prediction system in greater detail.
Figure 4:
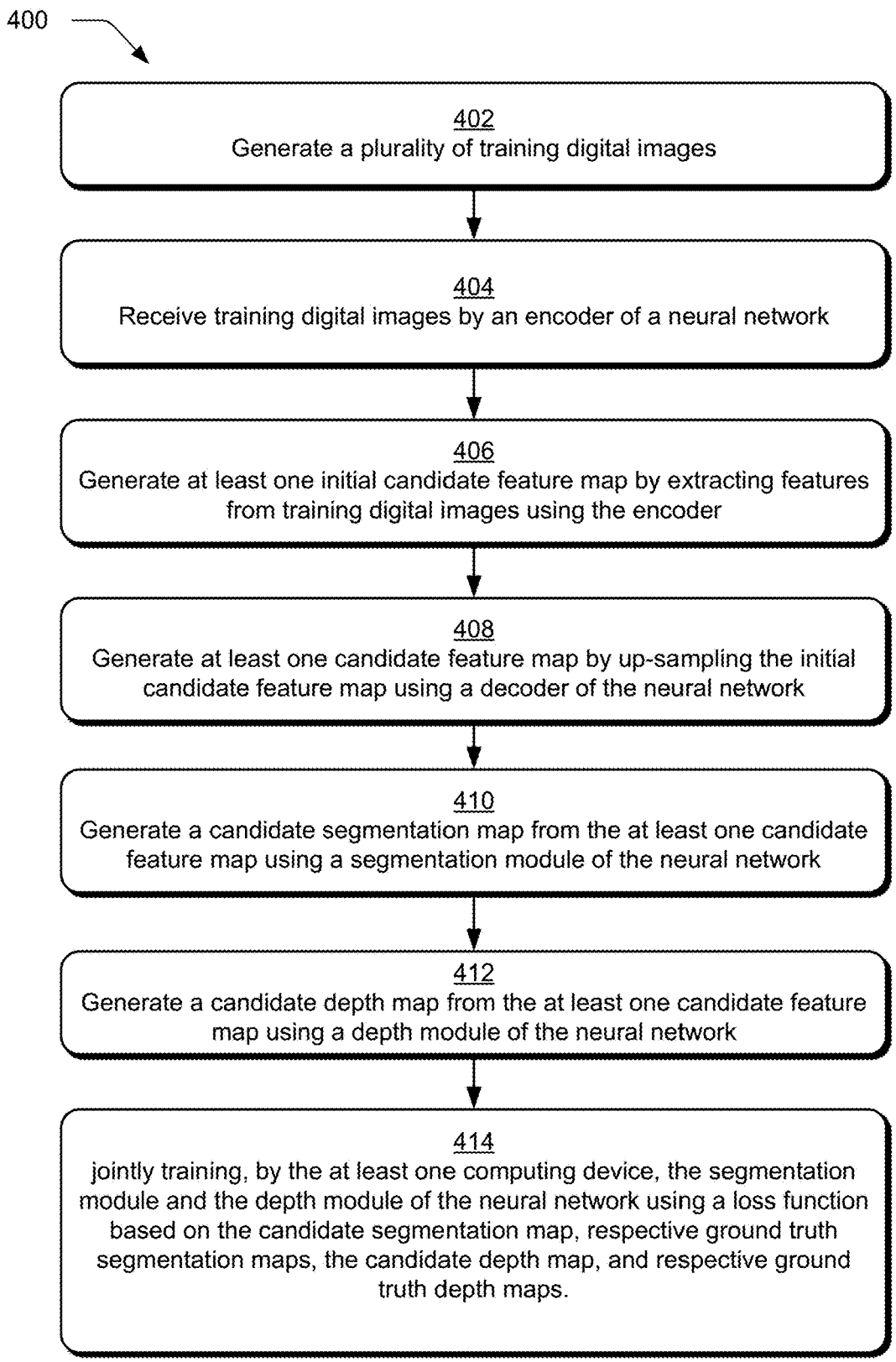
FIG. 4 is a flow diagram depicting an example procedure of training a depth prediction system to generate a depth map that accurately delineates the object boundaries within a single digital image.

FIG. 2 depicts a system 200 in an example operation of a depth prediction system 116 of FIG. 1 in greater detail. FIG. 3 depicts a system 300 in an example implementation also showing the neural network 120 of FIG. 1 in greater detail. FIG. 4 depicts a procedure 400 in an example implementation in which a depth module of a neural network is jointly trained with a segmentation module of the neural network to generate depth maps.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In the following discussion, reference is made interchangeably to FIGS. 2-4 and 7-8.

To begin in the illustrated example of FIG. 2, a training data generation module 202 of image processing system 104 generates a plurality of training digital images 204 (block 402). From these images, training data generation module 202 also generates respective ground truth depth maps 206 and ground truth segmentation maps 208, which may be normalized to serve as the respective normalized ground truth depth map and the normalized ground truth segmentation map. Specifically, the training data generation module 202 collects relative depth values from the plurality of training digital images 204 and normalizes these relative depth values to generate the normalized ground truth depth map. The relative depth values relate to ordinal depth information of objects in training digital images 204, which describe a depth of the objects in an order in relation to each other. Then, the training data generation module 202 generates respective ground truth segmentation maps 208 by identifying saliency values of training digital images 204 and normalizing these saliency values. The saliency values describe the saliency degree of the pixels of training digital images 204 in relation to each other. In one example, the normalized ground truth depth map and the normalized ground truth segmentation map can be generated from different or disjointed data sets of training digital images such that a set of these training digital images has only depth values or data and another set of these training digital images has only segmentation data (i.e. saliency values that describe the saliency degree of the pixels of the training digital images). In another example, the data sets of training digital images could include both depth data and segmentation data.

The ground truth depth maps 206 that are normalized and the ground truth segmentation maps 208 that are normalized are then passed to joint training module 228 of depth prediction system 116 to be used at a later stage as part of a supervised machine learning of depth prediction system 116.

Next, a feature extraction module 210 of the neural network 120 is employed to generate at least one candidate feature map 212 using machine learning. To do so, an encoder 214 of the neural network 120 receives training digital images (block 404) from the plurality of training digital images 204 generated as described above.

After receipt of the training digital images, encoder 214 of neural network 120 generates at least one initial candidate feature map 216 by extracting features from the training digital images (block 406). Specifically, encoder 214 generates the initial candidate feature map 216 using three steps as shown in FIG. 3. First, the encoder 214 performs a plurality of pooling operations using different kernel sizes on the extracted features. Second, the encoder 214 upsamples the extracted features that have been pooled with the use of bilinear interpolation. Third, the encoder 214 combines the pooled extracted features that are up-sampled with the extracted features using concatenation. From this, the initial candidate feature map 216 is generated. The initial candidate feature map 216 encodes high-level semantic features from the extracted features of at least one of the training digital images and preserves the resolution of the extracted features using a set of atrous convolutional layers, as also depicted in FIG. 3. The initial candidate feature map 216 generated by the encoder 214 is then passed to a decoder 218 of the feature extraction module 210 of the neural network 120.

The decoder 218 of the neural network 120 is then used to generate the candidate feature map 212 by upsampling the initial candidate feature map 216 (block 408). Decoder 218 includes a plurality of convolutional layers, as depicted in FIG. 3, and generates the candidate feature map 212 in a two-step process. First, the decoder 218 sequentially performs a plurality of bilinear interpolation operations on the initial candidate feature map 216. Second, the decoder 218 combines each result (with a particular resolution value) from the plurality of bilinear interpolation operations performed on the initial candidate feature map 216 with a corresponding resolution value associated with the initial candidate feature map 216. In this way, decoder 218 generates the candidate feature map 212, which is then passed to both a depth module 220 and segmentation module 222 of the neural network 120, respectively, to generate a candidate depth map 224 and a candidate segmentation map 226.

Upon receiving the candidate feature map 212, for instance, the segmentation module 222 of neural network 120 generates candidate segmentation map 226 (block 410). Specifically, segmentation module 222, which includes a plurality of convolution layers of the neural network 120, performs a segmentation operation on the received candidate feature map 212 such that the candidate segmentation map 226 segments pixels defining at least one of the training digital images into respective segments, e.g., a respective foreground segment or a background segment. This may be performed, for instance, based on a saliency of pixels in relation to each other to form segments of the candidate segmentation map 226.

Upon receiving the candidate feature map 212, the depth module 220 of neural network 120 generates a candidate depth map 224 (block 412). Specifically, depth module 220, which comprises a plurality of convolution layers, generates the candidate depth map 224 that describes an ordinal depth of objects in the image in relation to one another, in contrast to absolute depth values. Absolute depth values or absolute depth estimation measures distances between a particular observer and one or more objects within an image. In contrast, ordinal depth of objects describes the locational relationship of one or more objects with respect to one another. For example, ordinal depth could describe objects that appear in the foreground (or appear in front of) other objects that appear in the background of the image.

The candidate depth map 224 and the candidate segmentation map 226 are then output from depth module 220 and segmentation module 222, respectively, to the joint training module 228. The joint training module 228 of the neural network 120 then jointly trains the segmentation module 222 and the depth module 220 of the neural network 120 using a loss function 230 by sharing weights based on a comparison of the candidate segmentation map 226 and the candidate depth map 224 with the ground truth segmentation maps 208 and the ground truth depth maps 206 of the training digital images (block 414). As previously stated, ground truth depth maps 206 and ground truth segmentation maps 208 that are generated by training data generation module 202 and passed to joint training module 228 are now used in conjunction with the candidate depth map 224 and the candidate segmentation map 226 as part of the supervised machine learning of depth prediction system 116.

Prior to implementing the above loss function, the joint training module 228 normalizes the the ground truth depth maps 206 and the ground truth segmentation maps 208 to generate the normalized ground truth depth map and the normalized ground truth segmentation map. Then, then joint training module 228 jointly trains depth module 220 and segmentation module 222 using the loss function 230, an example of which is represented as follows:

$$J_d(\theta_d) = \|D - D^g\|_1 + \gamma \times \|S - S^g\|_1$$

Variables D, $D_g$, S, and $S_g$, represent, respectively, candidate depth map 224 that is normalized, ground truth depth maps 206 that are normalized to serve as ground truth (i.e. the normalized ground truth depth map), candidate segmentation map 226 that is normalized, and ground truth segmentation maps 208 that are normalized to serve as ground truth (i.e. the normalized ground truth segmentation map). The variable γ denotes a trade-off or stability factor that serves to balance the joint training of the depth module 220 and the segmentation module 222 of the neural network 120.

In one example, joint training module 228 jointly trains the depth module 220 and segmentation module 222 in multiple steps. First, the module calculates a difference between normalized candidate depth map 224 and ground truth depth maps 206 that are normalized. Thereafter, a difference between normalized candidate segmentation map 226 and ground truth segmentation maps 208 that are normalized is calculated. The calculated difference between normalized candidate segmentation map 226 and ground truth segmentation maps 208 that are normalized is subsequently adjusted by stability factor γ. Finally, the calculated difference between the normalized candidate depth map 224 and the ground truth depth maps 206 that are normalized is multiplied with the calculated difference between the normalized candidate segmentation map 226 and the ground truth segmentation map 208 that are normalized and adjusted with the stability factor. In effect, the results of comparing candidate segmentation map 226 with the ground truth segmentation maps 208 and the candidate depth map 224 and the ground truth depth maps 206, using the loss function 230, is used by the joint training module 228 to jointly train the depth module 220 and the segmentation module 222 of the neural network 120.

Figure 8:
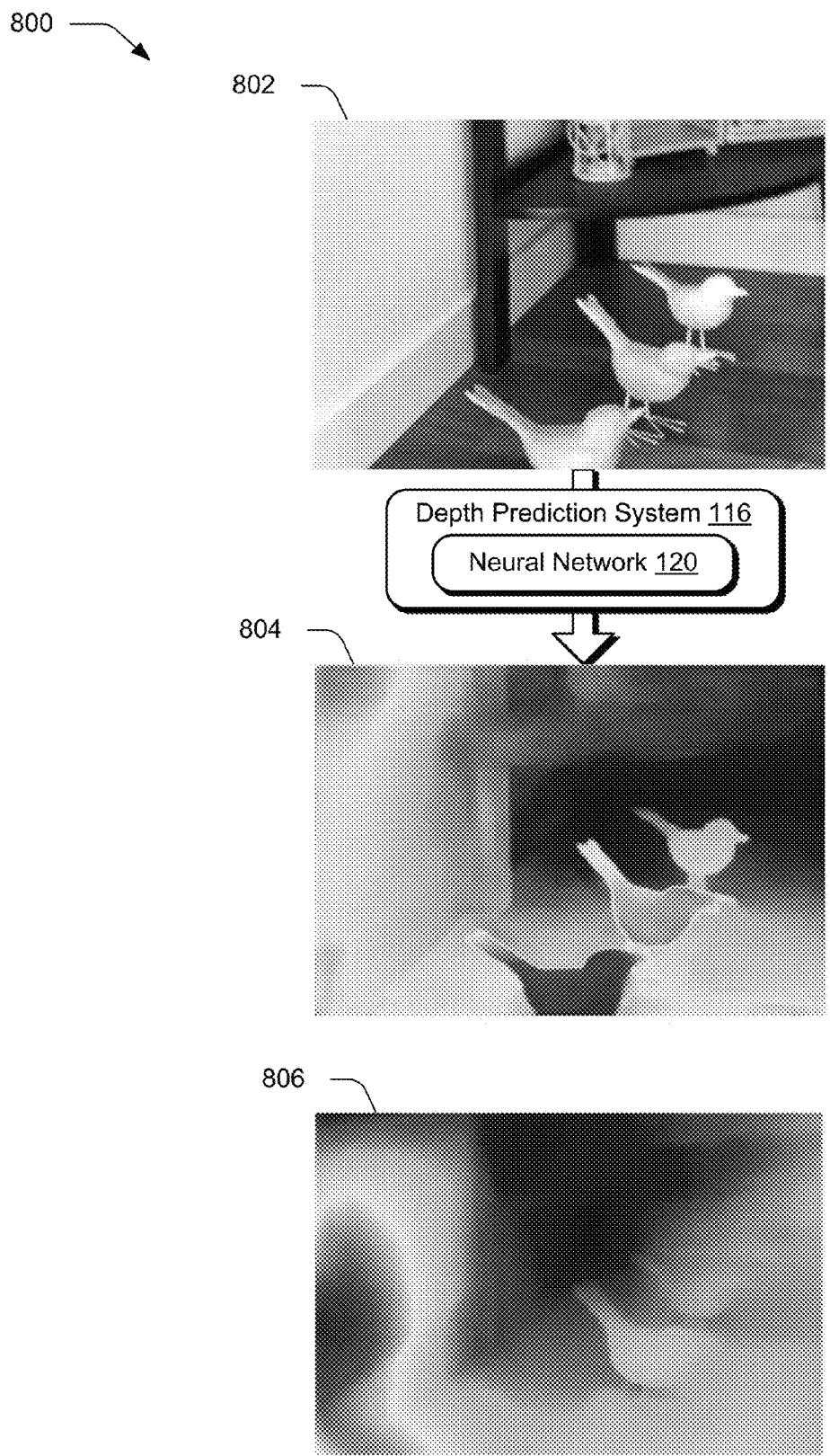
FIG. 8 depicts a second example contrasting a depth map generated using the described jointly trained depth module with the depth map generated by conventional depth map generation techniques.

This unique and robust joint training of depth module 220 with segmentation module 222 enables the trained depth module 220 to generate depth maps with increased accuracy over conventional techniques, as shown in FIGS. 7 and 8. Jointly training the depth module 220 with segmentation module 222 augments the accuracy of the depth module 220. As a result, the trained depth module 220 can clearly delineate boundaries between objects in the digital image, even for a single digital image in which disparity information is not available. Consequently, the depth prediction system described herein enables image processing systems to apply digital effect, such as depth-of-field blur effects, with increased accuracy, thereby avoiding visual artifacts at objects boundaries that occur as a result using conventional techniques.

Having described the joint training of depth module 220 with segmentation module 222, the operation of the trained depth module 220 to generate an accurate depth map from a single digital image is now described.

Depth Map Generation Using a Jointly Trained Depth Module

Figure 5:
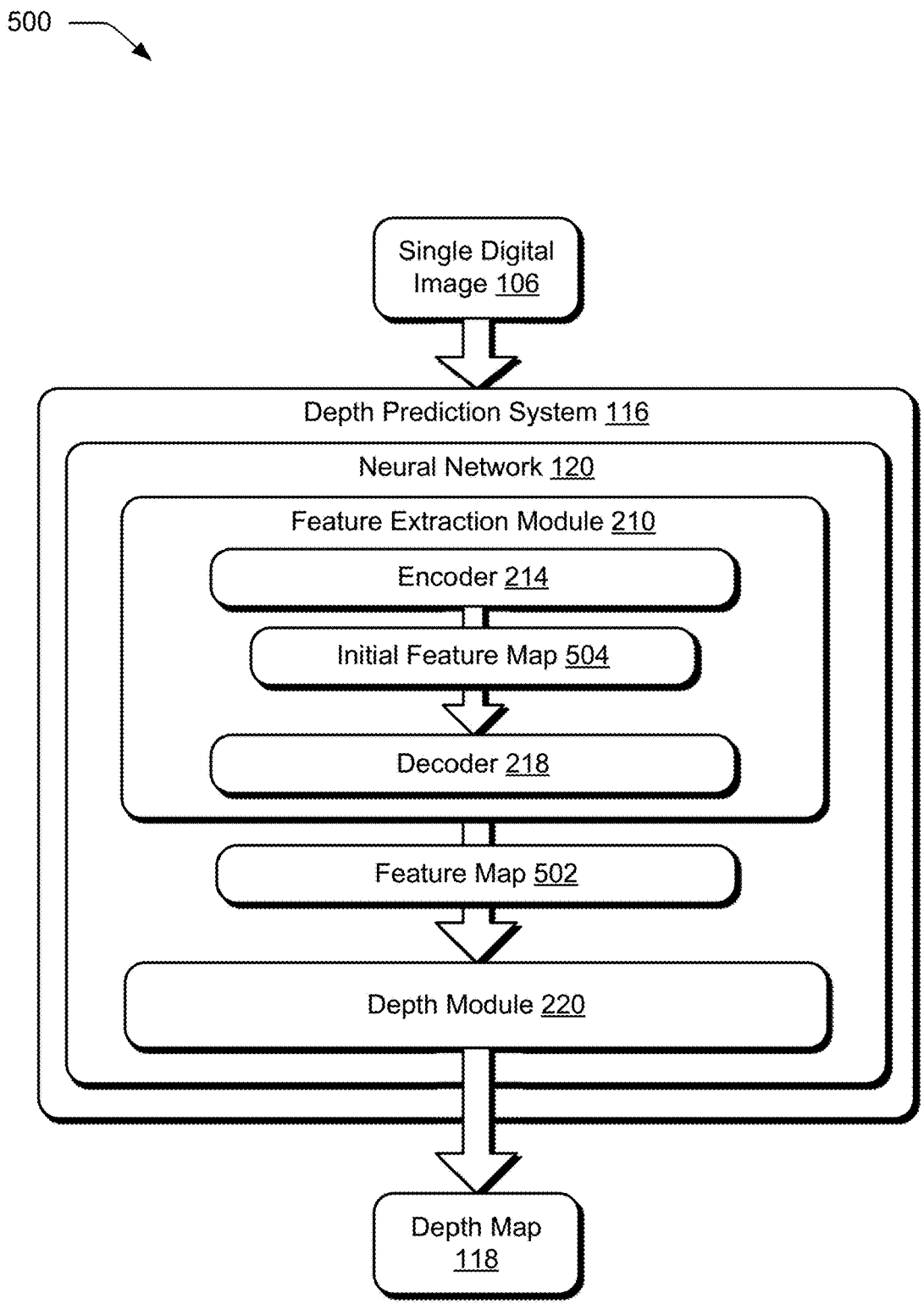
FIG. 5 depicts the operation of a depth prediction system configured to generate a depth map that accurately delineates objects boundaries within a digital image after the system's depth module is jointly trained with a segmentation module.

FIG. 5 depicts a system 500 in an example operation of the depth prediction system 116 using the depth module 220 that has been jointly trained with a segmentation module 222 as described in the previous section. FIG. 6 depicts a procedure 600 in an example implementation in which the depth module 220 that is jointly trained with the segmentation module of a neural network 120 generates a depth map 118 from a single digital image.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In the following discussion, reference is made interchangeably to FIGS. 5-8.

To begin in this example, the feature extraction module 210 is again used to generate a feature map 502 from the single digital image 106. To do so, an encoder 214 of the feature extraction module 210 generate an initial feature map 504 by extracting features from a single digital image 106 (block 602). As previously stated, the encoder 214 generates the initial feature map 504 in multiple steps. First, encoder 214 performs a plurality of pooling operations using different kernel sizes on the extracted features. Second, the encoder 214 up-samples the extracted features that have been pooled with the use of bilinear interpolation. Third, the encoder 214 combines the pooled extracted features that are up-sampled with the extracted features using concatenation.

The initial feature map 504 is then passed to decoder 218 of neural network 120. From this, the decoder 218 of neural network 120 generates the feature map 502 by upsampling the initial feature map 504 in a two-step operation (block 604). First, the decoder 218 sequentially performs a plurality of bilinear interpolation operations on the initial feature map. Second, the decoder 218 combines each result (with a particular resolution value) from the plurality of bilinear interpolation operations performed on feature map 502 with a corresponding resolution value associated with the feature map. In this way, the decoder 218 generates the feature map 502, which is then passed to the depth module 220.

From receiving the feature map, the depth module 220 generates a depth map 118 of the single digital image 106, the depth module 220 as previously described is jointly trained using a loss function 230 with a segmentation module 222 (block 606). The depth module has been jointly trained using a loss function 230 with segmentation module of the neural network as part of the supervised machine learning described in FIGS. 2-4 above. Based on this unique and robust joint training, depth module 220 generates depth map 118 which clearly delineates boundaries between objects in the received single digital image 106 and outputs the generated depth map (block 608). Advantageously, the depth map 118 enables image processing system 104 to generate digital effects, e.g. depth-of-field blur effects, with increased accuracy and in a way that avoids visual artifacts at object boundaries—a common problem in conventional techniques. The generated depth map 118 also describes ordinal depth of objects within the digital image with respect to each other.

FIG. 7 depicts a first example 700 of a depth map generated by depth prediction system 116 with neural network 120 that includes depth module 220 that has been jointly trained with a segmentation module using a loss function, as described above. The depth prediction system 116 receives a single digital image 122 and generates depth map 124 that clearly delineates the boundaries of objects with the image. As depicted, single digital image 122 shows an individual wearing glasses in the foreground with numerous objects such as a clock, table, and various types of lab equipment at various depth planes within the image. Depth map 124 is then generated by depth prediction system 116 using the depth module 220 that has been jointly trained with a segmentation module 222. As depicted, the depth map 124 clearly identifies the individual wearing the glasses (the object) in the foreground of the image with a clearly delineated object boundary. In contrast, in the depth maps 702 and 704 generated using conventional techniques do not clearly delineate boundaries around the individual. Instead, these depth maps 702, 704 show the individual as appearing both in the foreground and the background of the image.

FIG. 8 depicts a second example 800 of depth map generation by the depth module 220 of the depth prediction system 116 that has been jointly trained with a segmentation module 222 using a loss function 230 as described above. The depth prediction system 116 receives a single digital image 802 and generates a depth map 804 that clearly delineates the boundaries of objects with the image. In the illustrated example, the digital image 802 depicts three plastic birds located at varying depth levels within the image. From this, the depth prediction system 116, uses the jointly trained depth module of the neural network 120 to generate a depth map 804 that clearly delineates the boundaries of objects located across multiple depth planes within digital image 106. These plastic birds (i.e. objects) have been clearly depicted with different colors—dark red, light red, and white—designating the varying depth planes at which they are located in the image. In contrast, a conventional depth map 806 generated using conventional systems fails to accurately delineate the boundaries of the three birds.

In this way, the techniques described herein exhibit increased accuracy and computational resource efficiency over conventional techniques, namely by generating depth maps that accurately delineate the boundaries of objects within a single digital image using a unique and robustly trained neural network that describes the ordinal depth of objects within the single image.

Example System and Device

Figure 9:
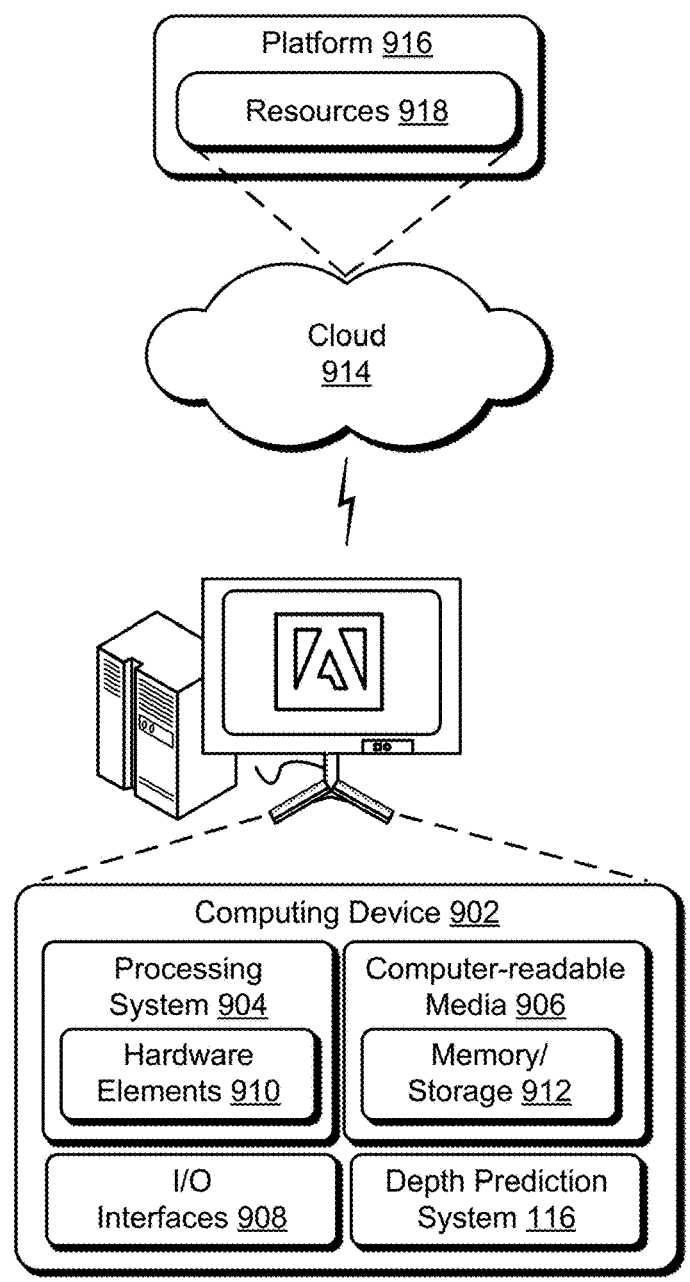
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 102 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium training environment, a method implemented by at least one computing device, the method comprising:
   extracting, using an encoder of a neural network by the at least one computing device, a plurality of feature maps corresponding to a plurality of resolutions, respectively, from training digital images;
   generating, using a decoder of the neural network by the at least one computing device, at least one candidate feature map by sequentially performing a plurality of up-sampling operations to at least one said feature map output by the encoder, in which, a result of each respective said up-sampling operation of the decoder is combined with a respective said feature map having a corresponding said resolution from the encoder of the neural network;
   generating, by the at least one computing device, a candidate segmentation map from the at least one candidate feature map using a segmentation module of the neural network;

generating, by the at least one computing device, a candidate depth map from the at least one candidate feature map using a depth module of the neural network; and jointly training, by the at least one computing device, the segmentation module and the depth module of the neural network using a loss function based on the candidate segmentation map, the candidate depth map, a respective ground truth segmentation map, and a respective ground truth depth map.

2. The method as described in claim 1, wherein generating the at least one initial candidate feature map further comprises:

performing a plurality of pooling operations on the extracted features using a plurality of kernel sizes;

up-sampling the pooled extracted features using bilinear interpolation; and combining the pooled extracted features that are up-sampled with the extracted features.

3. The method as described in claim 1, wherein the plurality of up-sampling operations are bilinear interpolation operations.

4. The method as described in claim 1, further comprising:

generating the respective ground truth depth map from at least one of the training digital images having a plurality of depth values and the respective ground truth segmentation map from at least one of the training digital images having a plurality of saliency values.

5. The method as described in claim 1, wherein jointly training the segmentation module and the depth module of the neural network using the loss function comprises sharing weights based on a comparison of the candidate segmentation map with the respective ground truth map segmentation map and the candidate depth map with the respective ground truth depth map.

6. The method as described in claim 5, wherein the comparison comprises:

normalizing the candidate depth map and the candidate segmentation map;

normalizing the respective ground truth depth map and the respective ground truth segmentation map to generate a normalized ground truth depth map and a normalized ground truth segmentation map;

calculating a difference between the normalized candidate depth map and the normalized ground truth depth map;

calculating a difference between the normalized candidate segmentation map and the normalized ground truth segmentation map;

adjusting the calculated difference between the normalized candidate segmentation map and the normalized ground truth segmentation map using a stability factor; and multiplying the adjusted the calculated difference between the normalized candidate segmentation map and the normalized ground truth segmentation map using a stability factor with the calculated difference between the normalized candidate depth map and the normalized ground truth depth map.

7. The method as described in claim 1, wherein the candidate depth map describes ordinal depths of objects with respect to each other within at least one of the training digital images.

8. The method as described in claim 1, wherein the candidate segmentation map partition pixels in at least one of the training digital images into respective foreground or background segments.

9. In a digital medium training environment, a system comprising:

a feature extraction module of the neural network implemented at least partially in hardware of a computing device to:

extract a plurality of feature maps corresponding to a plurality of resolutions, respectively, from training digital images; and generate at least one candidate feature map by sequentially performing a plurality of bilinear interpolation operations to at least one said feature map, in which, a result of each respective said up-sampling operation is combined with a respective said feature map having a corresponding resolution from the plurality of resolutions;

a segmentation module of the neural network implemented at least partially in hardware of the computing device to generate a candidate segmentation map from the at least one candidate feature map;

a depth module of the neural network implemented at least partially in hardware of the computing device to generate a candidate depth map from the at least one candidate feature map; and a joint training module of the neural network implemented at least partially in hardware of the computing device to jointly train the segmentation module and the depth module of the neural network using a loss function based on the candidate segmentation map, the candidate depth map, a respective ground truth segmentation map, and a respective ground truth depth map.

10. The system as described in claim 9, wherein the feature extraction module includes:

an encoder to generate the plurality of feature maps by extracting the features from the training digital images; and a decoder to generate the at least one candidate feature map by up-sampling the at least one said feature map.

11. The system as described in claim 10, wherein the encoder generating the at least one initial candidate feature map further comprises:

performing a plurality of pooling operations on the extracted features using a plurality of kernel sizes;

up-sampling the pooled extracted features using bilinear interpolation; and combining the pooled extracted features that are up-sampled with the extracted features.

12. The system as described in claim 9, wherein the joint training module of the neural network jointly trains the segmentation module and the depth module of the neural network using a loss function by sharing weights based on a comparison of the candidate segmentation map with the respective ground truth map segmentation map and the candidate depth map with the respective ground truth depth map.

13. The system as described in claim 12, wherein the comparison comprises:

normalizing the candidate depth map and the candidate segmentation map;

normalizing the respective ground truth depth map and the respective ground truth segmentation map to generate a normalized ground truth depth map and a normalized ground truth segmentation map;

calculating a difference between the normalized candidate depth map and the normalized ground truth depth map;

calculating a difference between the normalized candidate segmentation map and the normalized ground truth segmentation map;

adjusting the calculated difference between the normalized candidate segmentation map and the normalized ground truth segmentation map using a stability factor; and multiplying the adjusted calculated difference between the normalized candidate segmentation map and the normalized ground truth segmentation map using a stability factor with the calculated difference between the normalized candidate depth map and the normalized ground truth depth map.

14. The system as described in claim 9, wherein the candidate depth map describes ordinal depth of objects with respect to each other within at least one of the training digital images.

15. In a digital medium environment, a system comprising:

means for extracting a plurality of feature maps corresponding to a plurality of resolutions, respectively, from training digital images;

means for generating at least one candidate feature map by sequentially performing a plurality of up-sampling operations to at least one said feature map output, in which, a result of each respective said up-sampling operation is combined with a respective said feature map having a corresponding said resolution;

means for generating a candidate segmentation map from the at least one candidate feature map;

means for generating a candidate depth map from the at least one candidate feature map using a depth module of the neural network; and means for jointly training a neural network using a loss function based on the candidate segmentation map, the candidate depth map, a respective ground truth segmentation map, and a respective ground truth depth map.

16. The system as described in claim 15, wherein the means for generating the at least one initial candidate feature map further comprises:

means for performing a plurality of pooling operations on the extracted features using a plurality of kernel sizes;

means for up-sampling the pooled extracted features using bilinear interpolation; and means for combining the pooled extracted features that are up-sampled with the extracted features.

17. The system as described in claim 15, wherein the plurality of up-sampling operations are bilinear interpolation operations.

18. The system as described in claim 15, further comprising means for generating the respective ground truth depth map from at least one of the training digital images having a plurality of depth values and the respective ground truth segmentation map from at least one of the training digital images having a plurality of saliency values.

19. The system as described in claim 15, wherein the means for jointly training includes means for sharing weights based on a comparison of the candidate segmentation map with the respective ground truth map segmentation map and the candidate depth map with the respective ground truth depth map.

20. The system as described in claim 19, wherein the comparison comprises:

normalizing the candidate depth map and the candidate segmentation map;

normalizing the respective ground truth depth map and the respective ground truth segmentation map to generate a normalized ground truth depth map and a normalized ground truth segmentation map;

calculating a difference between the normalized candidate depth map and the normalized ground truth depth map;

calculating a difference between the normalized candidate segmentation map and the normalized ground truth segmentation map;

adjusting the calculated difference between the normalized candidate segmentation map and the normalized ground truth segmentation map using a stability factor; and multiplying the adjusted the calculated difference between the normalized candidate segmentation map and the normalized ground truth segmentation map using a stability factor with the calculated difference between the normalized candidate depth map and the normalized ground truth depth map.

* * * * *